US012222340B2

(12) United States Patent
Ueda et al.

(10) Patent No.: US 12,222,340 B2
(45) Date of Patent: Feb. 11, 2025

(54) PREPARATIVE LIQUID CHROMATOGRAPH

(71) Applicant: SHIMADZU CORPORATION, Kyoto (JP)

(72) Inventors: Shiori Ueda, Kyoto (JP); Tomohiro Shagawa, Kyoto (JP); Soichiro Tamaoki, Kyoto (JP); Tomoyuki Yamazaki, Kyoto (JP); Shohei Sato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 610 days.

(21) Appl. No.: 17/676,164

(22) Filed: Feb. 20, 2022

(65) Prior Publication Data
US 2022/0283132 A1  Sep. 8, 2022

(30) Foreign Application Priority Data

Mar. 2, 2021  (JP) .................................. 2021-032290

(51) Int. Cl.
*G01N 30/82* (2006.01)
*G01N 30/02* (2006.01)
(Continued)

(52) U.S. Cl.
CPC ............. *G01N 30/82* (2013.01); *G01N 30/16* (2013.01); *G01N 30/466* (2013.01); *G01N 30/8679* (2013.01); *G01N 2030/027* (2013.01)

(58) Field of Classification Search
CPC ...... G01N 30/82; G01N 30/16; G01N 30/466; G01N 30/8679; G01N 2030/027; G01N 30/02; B01D 15/247
See application file for complete search history.

(56) References Cited

U.S. PATENT DOCUMENTS 5,670,054 A * 9/1997 Kibbey .................. G01N 30/82
  210/659
2017/0234839 A1* 8/2017 Terada .................... G01N 30/46
  73/61.55
(Continued)

FOREIGN PATENT DOCUMENTS

JP  2010-014559 A  1/2010
TW  M575357 U  3/2019
(Continued)

OTHER PUBLICATIONS

Office Action for corresponding CN Application No. 2022100696116 issued Apr. 22, 2024, with English machine translation.
(Continued)

*Primary Examiner* — Jennifer Wecker
*Assistant Examiner* — Britney N. Washington
(74) *Attorney, Agent, or Firm* — Renner, Otto, Boisselle & Sklar, LLP

(57) ABSTRACT

A preparative liquid chromatograph for separating and extracting components in a sample, the preparative liquid chromatograph including a separation channel (2) through which a mobile phase flows, an injector (6) that injects the sample into the mobile phase, a separation column (8) for separating components in the sample injected into the mobile phase, the separation column (8) being provided downstream of the injector (6) on the separation channel (2), a detector (10) for detecting peaks of the components separated by the separation column (8), a fraction collector (12) configured to collect an eluate from the separation column (8) into a plurality of collection containers (20:22) at a downstream of the detector (10) while fractionating the eluate, and a controller (14) for controlling operation of the fraction collector (12), wherein the fraction collector (12) is provided with peak collection containers (20) and waste liquid collection containers (22), each peak collection con-
(Continued)

tainer (20) is used for collecting a peak portion including a collection target peak detected by the detector (10) in the eluate, and each waste liquid collection container (22) is used for collecting a waste liquid portion not including the collection target peak in the eluate, and the controller (14) is configured to collect the peak portion including the collection target peak detected by the detector (10) in the eluate in the peak collection container (20), and to collect at least a part of the waste liquid portion in the waste liquid collection container (22).

4 Claims, 3 Drawing Sheets

(51) Int. Cl.
*G01N 30/16* (2006.01)
*G01N 30/46* (2006.01)
*G01N 30/86* (2006.01)

(56) References Cited

U.S. PATENT DOCUMENTS

2020/0033303 A1\* 1/2020 Tamaoki ............ G01N 30/8658
2022/0137007 A1 5/2022 Owa

FOREIGN PATENT DOCUMENTS

WO 2018/185872 A1 10/2018
WO 2020179003 A1 9/2020

OTHER PUBLICATIONS

Office Action for corresponding JP Application No. 2021-032290 issued Apr. 16, 2024, with English machine translation.
Decision of Rejection for corresponding CN Application No. 202210069611.6 issued Jun. 29, 2024, with English machine translation.
Office Action for corresponding CN Application No. 2022100696116 dated Aug. 15, 2023, with English translation.

\* cited by examiner

PREPARATIVE LIQUID CHROMATOGRAPH

BACKGROUND OF THE INVENTION

1. Field of the Invention

The present invention relates to a preparative liquid chromatograph.

2. Description of the Related Art

A preparative liquid chromatograph that separates and collects a plurality of components contained in a sample using a chromatograph such as a high performance liquid chromatograph is known (see WO 2018/185872 A). A preparative liquid chromatograph is a system in which components in a sample injected into a mobile phase flowing through a separation channel are separated by a separation column, peaks of the separated components are detected based on a signal of a detector, and the detected peaks are fractionated and collected in individual collection containers by a fraction collector provided at a subsequent stage of the detector.

Samples separated and extracted by a preparative liquid chromatograph are often valuable. Therefore, it is desirable to avoid as much as possible that the collection target components are lost due to an error in setting an extraction condition or the like. To prevent loss of the collection target components, a method is also proposed in which a waste bottle is provided further downstream of the fraction collector, and a waste liquid portion not including the collection target components in the eluate from the separation column is stored in the waste liquid bottle (see JP 2010-014559 A).

SUMMARY OF THE INVENTION

In the method of storing the waste liquid portion in the waste liquid bottle provided downstream of the fraction collector as described above, because a large amount of waste liquid is stored in the same container, the collection target components flowing to the waste liquid side are highly diluted, and it takes a long time to concentrate the collection target components when the waste liquid stored in the waste liquid bottle is reused.

Therefore, it is also conceivable to store the waste liquid portion separately in a plurality of waste liquid bottles. In such a case, a configuration is conceivable in which a multiport valve is provided downstream of the fraction collector, and a waste liquid bottle for collecting a waste liquid portion is selected by the multiport valve. However, in such a case, the number of ports of the multiport valve is the upper limit of the number of waste liquid bottles to be installed, and there is also a limit to the number for dividing the waste liquid.

In addition, when a multiport valve is provided downstream of the fraction collector, not only the configuration of the equipment becomes complicated and the equipment cost increases, but also the occurrence rate of defects increases. For example, when the channel is closed in the multiport valve downstream of the fraction collector, the pressure in the channel upstream thereof increases, and other elements (switching valve and the like) may be damaged.

The present invention has been made in view of the above problems, and makes it possible to reuse a waste liquid with high efficiency without complicating a configuration of equipment.

A preparative liquid chromatograph according to the present invention is a preparative liquid chromatograph for separating and extracting components in a sample, the preparative liquid chromatograph including a separation channel through which a mobile phase flows, an injector that injects the sample into the mobile phase, a separation column for separating the components in the sample injected into the mobile phase, the separation column being provided downstream of the injector on the separation channel, a detector for detecting peaks of the components separated by the separation column, a fraction collector configured to collect an eluate from the separation column into a plurality of collection containers at a downstream of the detector while fractionating the eluate, and a controller for controlling operation of the fraction collector, wherein the fraction collector is provided with peak collection containers and waste liquid collection containers, each peak collection container is used for collecting a peak portion including a collection target peak detected by the detector in the eluate, and each waste liquid collection container is used for collecting a waste liquid portion not including the collection target peak in the eluate, and the controller is configured to collect the peak portion including the collection target peak detected by the detector in the eluate in the peak collection container, and to collect at least a part of the waste liquid portion in the waste liquid collection container.

According to the preparative liquid chromatograph of the present invention, the fraction collector is provided with the peak collection containers for collecting peak portions including collection target peaks detected by the detector in an eluate from the separation column and the waste liquid collection containers for collecting a waste liquid portion not including the collection target peak in the eluate, and the controller is configured to collect the peak portion including the collection target peak detected by the detector in the eluate in the peak collection container and collect at least a part of the waste liquid portion in the waste liquid collection container, and therefore the waste liquid can be reused with high efficiency without complicating the configuration of equipment.

DETAILED DESCRIPTION OF THE INVENTION

Hereinafter, an embodiment of a preparative liquid chromatograph according to the present invention will be described with reference to the drawings.

Figure 1:
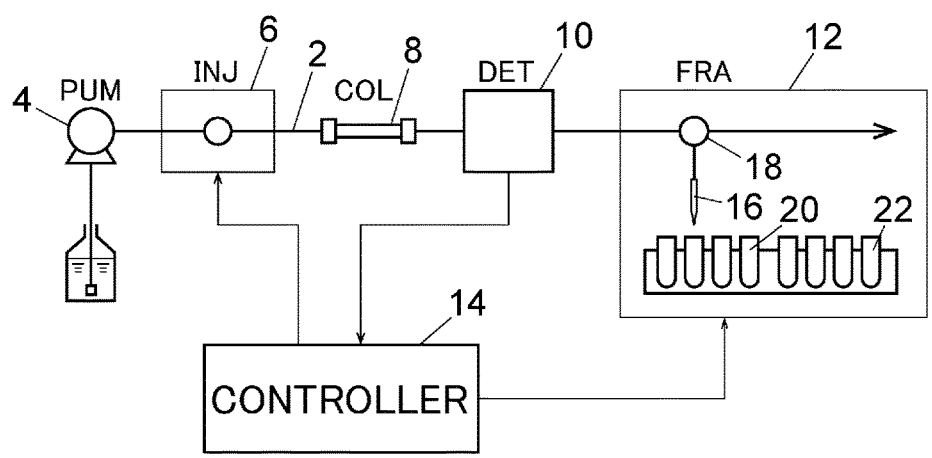
FIG. 1 is a schematic configuration diagram showing an embodiment of a preparative liquid chromatograph.

As shown in FIG. 1, the preparative liquid chromatograph includes a separation channel 2, a liquid feeding pump 4 (PUM), an injector 6 (INJ), a separation column 8 (COL), a detector 10 (DET), a fraction collector 12 (FRA), and a controller 14.

The liquid feeding pump 4 feeds a mobile phase in the separation channel 2. The injector 6 is a device that injects a sample into the mobile phase flowing through the separation channel 2. The separation column 8 is provided downstream of the injector 6 on the separation channel 2, and the components of the sample injected into the mobile phase by the injector 6 are separated from each other in the separation column 8. The detector 10 is provided downstream of the separation column 8 on the separation channel 2, and a peak of each component separated in the separation column 8 is detected based on a detection signal of the detector 10.

The fraction collector 12 is a device for fractionating and collecting an eluate from the separation column 8 into a plurality of containers at a downstream of the detector 10. The fraction collector 12 includes a movable probe 16 and a switching valve 18 for switching and guiding the channel on the outlet side of the detector 10 to the probe 16 side and to the drain side. In addition, the fraction collector 12 is provided with a plurality of peak collection containers 20 for collecting a portion including peaks of collection target components (peak portion) in the eluate from the separation column 8, and a plurality of waste liquid collection containers 22 for collecting a waste liquid portion not including a collection target peak.

The operation of the fraction collector 12 is controlled by the controller 14. The controller 14 can be realized by a computer device for performing operation management of the preparative liquid chromatograph. The controller 14 is configured to detect a collection target peak from a chromatogram obtained from the detection signal of the detector 10 according to an extraction condition set in advance by a user, and fractionate and collect a peak portion including the collection target peak in individual peak collection containers 20. Furthermore, the controller 14 is configured to collect at least a part of the waste liquid portion not including the collection target peak in the waste liquid collection container 22 in order to prevent loss of the collection target components.

The user can designate at least one collection target peak to be collected in the peak collection container 20 with reference to, for example, a chromatogram acquired in advance for the sample displayed on a display communicable with the controller 14. The controller 14 controls the fraction collector 12 based on the detection signal of the detector 10 so as to collect the peak portion including the collection target peak designated by the user in the individual peak collection containers.

There is a high possibility that the collection target components that have not been collected in the peak collection container 20 are included in waste liquid portions before and after the peak portion. Therefore, the controller 14 may be configured to set, when the collection target peak is designated by the user, the waste liquid portions before and after the designated collection target peak as the waste liquid portion to be collected in the waste liquid collection container 22. In this case, the user may optionally designate how much the waste liquid portions before and after the collection target peak are collected in the waste liquid collection container 22.

Figure 2:
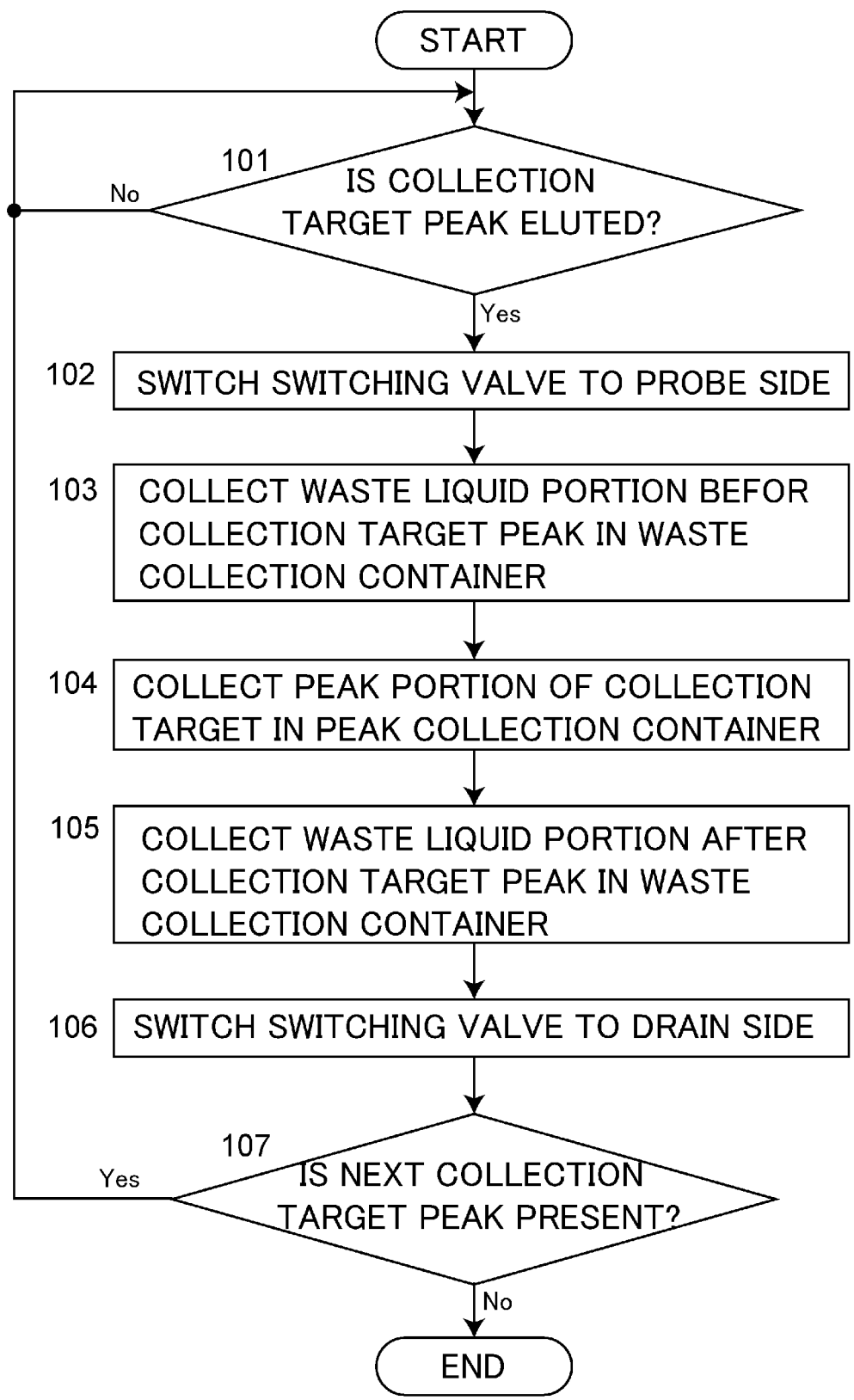
FIG. 2 is a flowchart showing an example of an operation of the embodiment.

An example of an operation of separating and extracting a sample in this embodiment will be described with reference to FIG. 1 and the flowchart of FIG. 2.

When a sample is injected into a mobile phase flowing through the separation channel 2 by the injector 6, components in the sample are temporally separated in the separation column 8, and the separated components are introduced into the detector 10, whereby a detection signal based on the concentration of each component is acquired. The controller 14 detects elution of the collection target peak designated in advance by the user from the separation column 8 based on the detection signal of the detector 10 (step 101). For detection of a peak, for example, a method of detecting a start point and an end point of a peak by comparing a slope in a chromatogram with a preset threshold value can be used.

At the beginning when sample separation and extraction are started, the switching valve 18 of the fraction collector 12 connects the channel on the outlet side of the detector 10 to the drain side. When detecting the elution of the collection target peak from the separation column 8, the controller 14 switches the switching valve 18 so that the channel on the outlet side of the detector 10 is connected to the probe 16 at the timing when a predetermined amount of the waste liquid portion before the collection target peak reaches the switching valve 18 (step 102). As a result, the eluate from the separation column 8 is dropped from the tip of the probe 16. The controller 14 causes the fraction collector 12 to collect a predetermined amount of the waste liquid portion before the collection target peak in the waste liquid collection container 22 (step 103), then collect the peak portion including the collection target peak in the peak collection container 20 (step 104), and further collect a predetermined amount of the waste liquid portion after the collection target peak in the waste liquid collection container 22 (step 105). The waste liquid portion before the collection target peak and the waste liquid portion after the collection target peak are collected in waste liquid collection containers 22 different from each other.

After the waste liquid portion after the collection target peak is collected in the waste liquid collection container 22, the controller 14 switches the switching valve 18 so as to connect the outlet of the detector 10 to the drain side (step 106). Thereafter, when the next collection target peak is present, the process returns to the step 101 and waits until the next collection target peak is eluted from the separation column 8, and the steps 102 to 106 are repeated.

Figure 3:
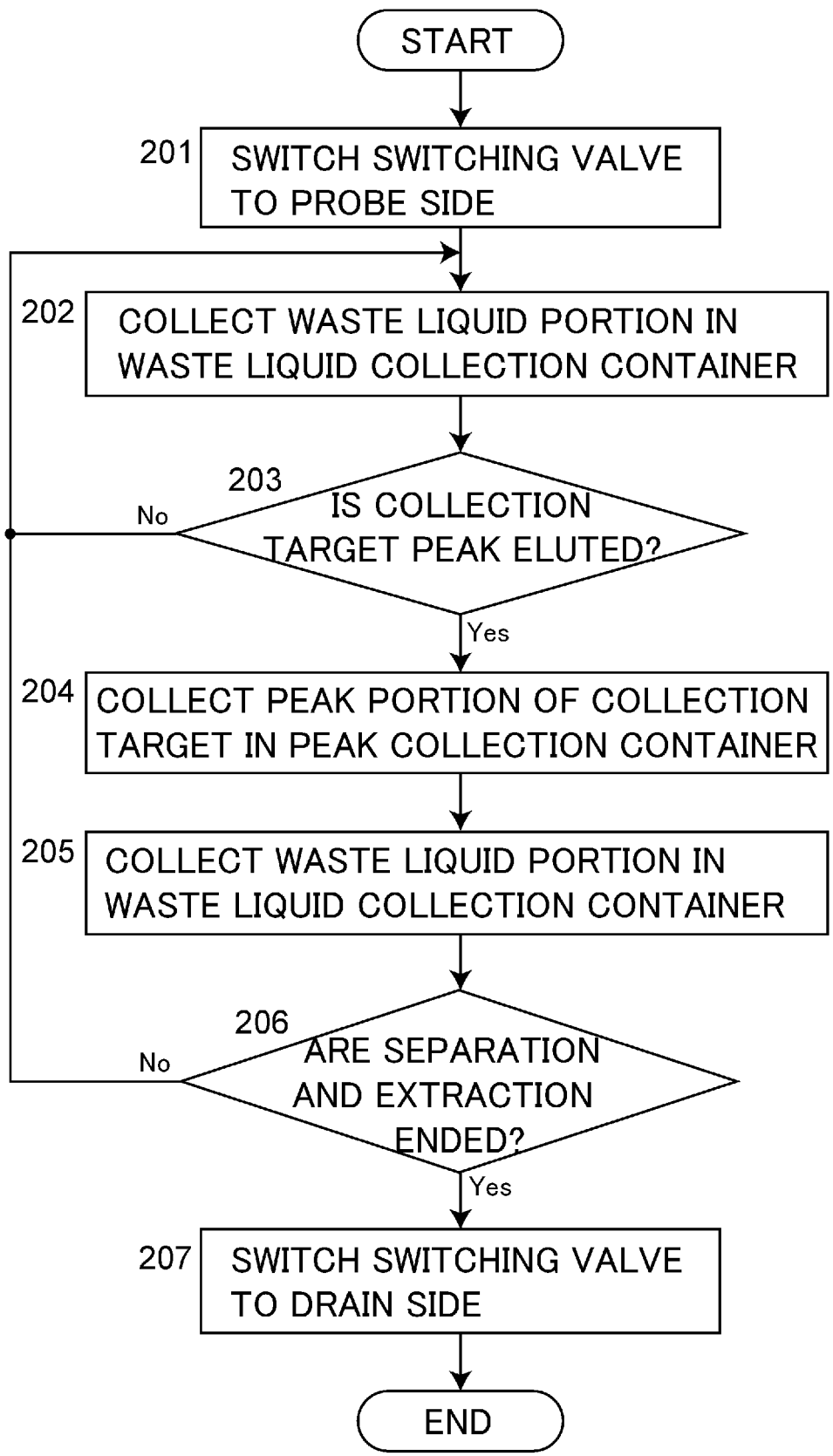
FIG. 3 is a flowchart showing another example of an operation of the embodiment.

In the above operation, only the waste liquid portions before and after the collection target peak in the eluate from the separation column 8 are collected in the waste liquid collection container 22, but the present invention is not limited thereto, and all of the waste liquid portion from the start to the end of the separation and extraction of the sample may be collected in the waste liquid collection container 22. An example of an operation of collecting all of the waste liquid portion from the start to the end of the separation and extraction of a sample in the waste liquid collection container 22 will be described with reference to FIG. 1 and the flowchart of FIG. 3.

When a sample is injected into a mobile phase flowing through the separation channel 2 by the injector 6, at this time point, the controller 14 switches the switching valve 18 of the fraction collector 12 to a state in which the channel on the outlet side of the detector 10 is connected to the probe 16 side (step 201), and causes the fraction collector 12 to collect the waste liquid portion in the waste liquid collection container 22 (step 202). When detecting that the collection target peak is eluted from the separation column 8 (step 203), the controller 14 moves the probe 16 to a position on an empty peak collection container 20 at the timing when the peak portion reaches the switching valve 18, and collects the peak portion in the peak collection container 20 (step 204).

When the collection of the peak portion in the peak collection container 20 is completed, the probe 6 is moved onto the waste liquid collection container 22 again to collect the waste liquid portion in the waste liquid collection container 22 (step 205). Thereafter, the controller 14 repeatedly executes the steps 202 to 205 until the separation and extraction of the sample are completed, and when the separation and extraction of the sample are completed, the switching valve 18 is switched to the drain side (step 207).

A plurality of waste liquid collection containers 22 can be used to collect the waste liquid portion.

The embodiment described above is merely an example of an embodiment of a preparative liquid chromatograph according to the present invention. The embodiment of a preparative liquid chromatograph according to the present invention is as follows.

A first embodiment of the preparative liquid chromatograph according to the present invention is a preparative liquid chromatograph for separating and extracting components in a sample, the preparative liquid chromatograph including a separation channel through which a mobile phase flows, an injector that injects the sample into the mobile phase, a separation column for separating components in the sample injected into the mobile phase, the separation column being provided downstream of the injector on the separation channel, a detector for detecting peaks of the components separated by the separation column, a fraction collector configured to collect an eluate from the separation column into a plurality of collection containers at a downstream of the detector while fractionating the eluate, and a controller for controlling operation of the fraction collector, wherein the fraction collector is provided with a peak collection containers and waste liquid collection containers, each peak collection container is used for collecting a peak portion including a collection target peak detected by the detector in the eluate, and the waste liquid collection container is used for collecting a waste liquid portion not including the collection target peak in the eluate, and the controller is configured to collect the peak portion including the collection target peak detected by the detector in the eluate in the peak collection container, and to collect at least a part of the waste liquid portion in the waste liquid collection container.

In a first aspect of the first embodiment, the controller is configured to require a user to designate, on a chromatogram of the sample acquired in advance, at least one collection target peak to be collected in the peak collection container, and is configured to collect at least one peak portion each including the at least one collection target peak designated by the user in the peak collection container and waste liquid portions before and after the at least one peak portion in the waste liquid collection container. According to such an aspect, the collection target components flowing before and after the peak portion collected in the peak collection container can be collected without significant dilution.

In the first aspect, the controller may be configured to require a user to designate an amount of each of the waste liquid portions to be collected before and after the at least one peak portion in the waste liquid collection container. This allows the user to optionally set how much the waste liquid portions before and after the peak portion are collected according to a chromatogram or the like acquired in advance.

In a second aspect of the embodiment, the controller is configured to collect all of the waste liquid portion in the waste liquid collection container after separation and extraction, which is started by injecting a sample into the mobile phase, of the sample is started until the separation and extraction are completed. As a result, even when there is a mistake in setting the sorting condition, because the entire waste liquid portion is collected in the waste container collection container, it is possible to prevent loss of valuable sample and the waste liquid portion can be reused.

DESCRIPTION OF REFERENCE SIGNS

2: separation channel
4: liquid feeding pump
6: injector
8: separation column
10: detector
12: fraction collector
14: controller
16: probe
18: switching valve
20: peak collection container
22: waste liquid collection container

What is claimed is:

1. A preparative liquid chromatograph for separating and extracting components in a sample, the preparative liquid chromatograph comprising: a separation channel through which a mobile phase flows;
   an injector that injects the sample into the mobile phase;
   a separation column for separating the components in the sample injected into the mobile phase, the separation column being provided downstream of the injector on the separation channel;
   a detector for detecting peaks of the components separated by the separation column;
   a fraction collector configured to collect an eluate from the separation column into a plurality of collection containers at a downstream of the detector while fractionating the eluate;
   wherein the fraction collector is provided with both a set of peak collection containers and a set of waste liquid collection containers, each peak collection container configured to collect a peak portion including a collection target peak detected by the detector in the eluate, and each waste liquid collection container configured to collect a waste liquid portion not including the collection target peak in the eluate;
   a controller configured for controlling operation of the fraction collector;
such that the controller is configured to collect the peak portion including the collection target peak detected by the detector in the eluate in the peak collection container, and to collect at least a part of the waste liquid portion in the waste liquid collection container.

2. The preparative liquid chromatograph according to claim 1, wherein the controller is configured to require a user to designate, on a chromatogram of the sample acquired in advance, at least one collection target peak to be collected in the peak collection container, and is configured to collect at least one peak portion each including the at least one collection target peak designated by the user in the peak collection container and to collect waste liquid portions before and after the at least one peak portion in the waste liquid collection containers.

3. The preparative liquid chromatograph according to claim 2, wherein the controller is configured to require a user to designate an amount of each of the waste liquid portions to be collected before and after the at least one peak portion in the waste liquid collection container.

4. The preparative liquid chromatograph according to claim 1, wherein the controller is configured to collect all of the waste liquid portion in the waste liquid collection container after separation and extraction, which is started by injecting a sample into the mobile phase, wherein sample injection is started when the separation and extraction are completed.

* * * * *